US010057717B2

(12) United States Patent
Lee

(10) Patent No.: US 10,057,717 B2
(45) Date of Patent: *Aug. 21, 2018

(54) LOCATION DETERMINING SCHEME

(71) Applicant: EMPIRE TECHNOLOGY DEVELOPMENT LLC, Wilmington, DE (US)

(72) Inventor: Hyoung-Gon Lee, Gyeonggi-do (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,135

(22) Filed: May 22, 2017

(65) Prior Publication Data
US 2017/0257745 A1   Sep. 7, 2017

Related U.S. Application Data

(63) Continuation of application No. 14/758,595, filed as application No. PCT/US2013/077950 on Dec. 27, 2013, now Pat. No. 9,661,465.

(51) Int. Cl.
| | |
|---|---|
| *H04W 4/02* | (2018.01) |
| *H04L 12/26* | (2006.01) |
| *H04W 52/28* | (2009.01) |
| *H04W 52/32* | (2009.01) |
| *H04W 52/40* | (2009.01) |
| *H04W 52/50* | (2009.01) |
| *H04W 84/12* | (2009.01) |

(52) U.S. Cl.
CPC ............. *H04W 4/023* (2013.01); *H04L 43/12* (2013.01); *H04W 4/02* (2013.01); *H04W 52/283* (2013.01); *H04W 52/325* (2013.01); *H04W 52/40* (2013.01); *H04W 52/50* (2013.01); *H04W 84/12* (2013.01)

(58) Field of Classification Search
CPC ..... H04W 4/023; H04W 52/50; H04W 52/40; H04W 52/325; H04W 52/283; H04W 4/02; H04W 84/12; H04L 43/12
See application file for complete search history.

(56) References Cited

U.S. PATENT DOCUMENTS

| | | |
|---|---|---|
| 7,433,694 B2 | 10/2008 | Morgan et al. |
| 8,385,243 B2 | 2/2013 | Sridhara et al. |
| 2008/0176583 A1 | 7/2008 | Brachet et al. |

(Continued)

FOREIGN PATENT DOCUMENTS

WO    2007133967 A2    11/2007

OTHER PUBLICATIONS

International Search Report and Written Opinion for International Application No. PCT/US2013/077950 dated Apr. 22, 2014, pp. 6.

*Primary Examiner* — Chuong A Ngo

(57) ABSTRACT

A method performed under control of a mobile device may include receiving at least one probe response from at least one access point; determining whether a number of the at least one Wi-Fi access point satisfies a predetermined condition; adjusting a signal transmission power of a probe request, when the determining indicates that the number of the at least one Wi-Fi access point does not satisfy the predetermined condition; and transmitting the probe request with the adjusted signal transmission power.

14 Claims, 8 Drawing Sheets

(56) References Cited

U.S. PATENT DOCUMENTS

| | | |
|---|---|---|
| 2010/0008277 A1 | 1/2010 | Kopikare et al. |
| 2010/0080134 A1* | 4/2010 | Maniatopoulos ..... H04W 48/16 |
| | | 370/252 |
| 2012/0249300 A1 | 10/2012 | Avital et al. |
| 2013/0231151 A1* | 9/2013 | Kneckt ............... H04W 40/246 |
| | | 455/515 |
| 2013/0308579 A1* | 11/2013 | Pulugurta, Sr. ....... H04W 52/04 |
| | | 370/329 |

* cited by examiner

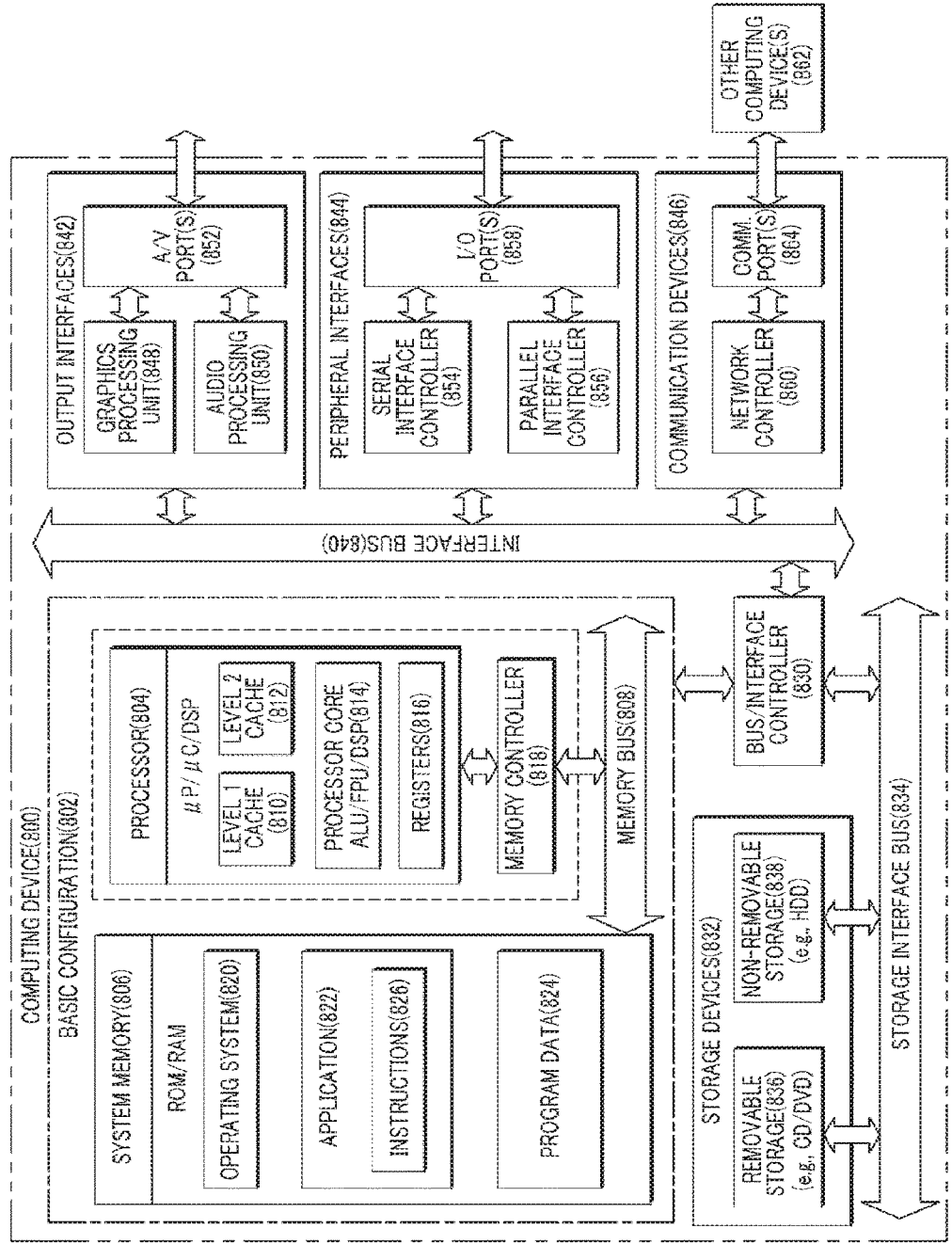

US 10,057,717 B2

LOCATION DETERMINING SCHEME

CROSS-REFERENCE TO RELATED APPLICATIONS

This Application is a continuation application under 35 U.S.C. § 120 of U.S. application Ser. No. 14/758,595 filed on Jun. 30, 2015, now U.S. Pat. No. 9,661,465, which is the U.S. National Stage filing under 35 U.S.C. § 371 of International Application No. PCT/US13/077950 filed on Dec. 27, 2013. International Application No. PCT/US13/077950 and U.S. application Ser. No. 14/758,595 are herein incorporated by reference in their entirety.

BACKGROUND

Mobile positioning via a mixture of GPS, cell towers, and previously mapped RF transmitters, e.g., Wi-Fi access points, is commonly available. However, indoor environments tend to be poor for GPS reception, necessitating reliance on other mechanisms. For example, one mechanism for improving reception is to make use of cell towers, e.g., using information about signal intensity from multiple known cell towers to triangulate an approximate location. Another approach is to use a database of known Wi-Fi transmitters, or other unregulated radio frequency (RF) transmitters.

SUMMARY

In an example, a method performed under control of a mobile device may include receiving at least one probe response from at least one Wi-Fi access point; determining whether a number of the at least one Wi-Fi access point satisfies a predetermined condition; adjusting a signal transmission power of a probe request, when the determining indicates that the number of the at least one Wi-Fi access point does not satisfy the predetermined condition; and transmitting the probe request with the adjusted signal transmission power.

In another example, a mobile device may include a receiving unit configured to receive at least one probe response from at least one Wi-Fi access point; a determining unit configured to determine whether a number of the at least one Wi-Fi access point satisfies a predetermined condition; a signal power adjusting unit configured to adjust a signal transmission power of a probe request, when the determining unit determines that the number of the at least one Wi-Fi access point does not satisfy the predetermined condition; and a transmitting unit configured to transmit the probe request with the adjusted signal transmission power.

In yet another example, a computer-readable storage medium may store thereon computer-executable instructions that, in response to execution, cause a mobile device to perform operations including receiving at least one probe response from at least one Wi-Fi access point; determining whether a number of the at least one Wi-Fi access point satisfies a predetermined condition; adjusting a signal transmission power of a probe request, when the determining indicates that the number of the at least one Wi-Fi access point does not satisfy the predetermined condition; and transmitting the probe request with the adjusted signal transmission power.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 8 is a block diagram illustrating an example computing device that may be utilized to provide a scheme for determining a location of a mobile device, arranged in accordance with at least some embodiments described herein.

DETAILED DESCRIPTION

Figure 1:
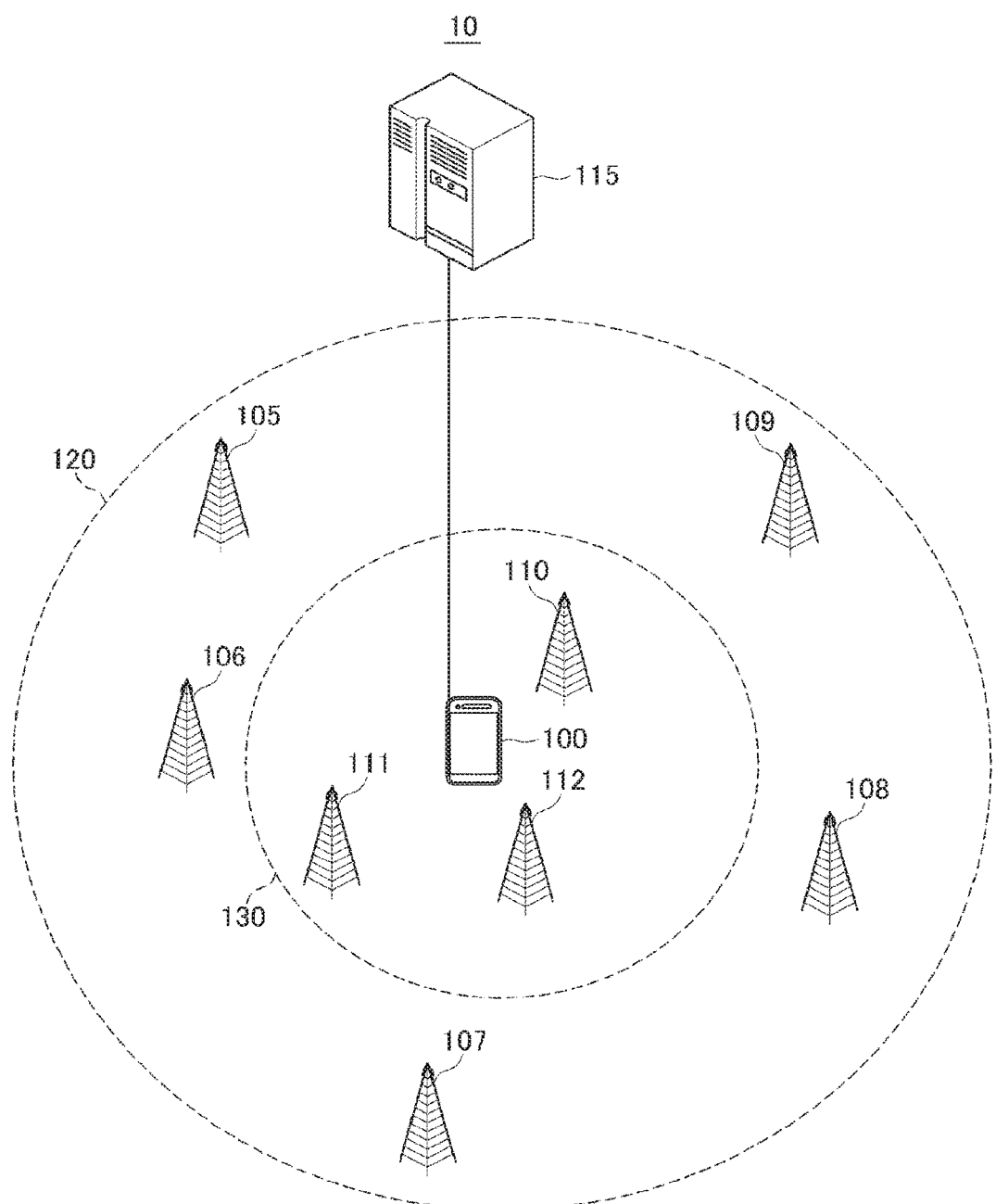
FIG. 1 schematically shows an illustrative example of a mobile device location determination environment including a mobile device, multiple Wi-Fi access points and a location estimating server, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a location determining scheme. Technologies are generally described for schemes for determining a location of a mobile device by adjusting a signal transmission power of a probe request.

In some examples, a mobile device may be configured to transmit a probe request to multiple Wi-Fi access points around the mobile device with a default signal transmission power (e.g., a maximized signal transmission power). Each of the multiple Wi-Fi access points, which received the probe request from the mobile device, may be configured to transmit a probe response to the mobile device, in response to the probe request. By way of example, but not as a limitation, each probe response of a Wi-Fi access point may include at least one of an identifier of the Wi-Fi access point, an internet protocol (IP) address of the Wi-Fi access point, a media access control (MAC) address of the Wi-Fi access point, a name of a network provided by the Wi-Fi access point (e.g., a service set identifier (SSID)), a port number of the Wi-Fi access point, location information of the Wi-Fi access point, a signal power or a bandwidth of a network which the Wi-Fi access point provides. The mobile device may be configured to receive multiple probe responses from the multiple Wi-Fi access points, and to count a first number of the Wi-Fi access points. The first number may refer to a number of Wi-Fi access points that transmit probe responses when the Wi-Fi access points receive a probe request with the default signal transmission power. Further, the mobile device may be configured to determine whether the first number of the Wi-Fi access points is within a predetermined range. The predetermined range may refer to a number range of Wi-Fi access points to be used for determining a location of the mobile device. By way of example, if there are too many Wi-Fi access points in the vicinity of the mobile device, it is inefficient and/or complicated to determine the location of the mobile device by using information about all of the Wi-Fi access points. Accordingly, it is necessary to reduce a number of Wi-Fi access points to be used for determining the location of the mobile device, properly.

The mobile device may be further configured to decrease a signal transmission power of a probe request, if the number of the received probe responses is larger than the predetermined range. Then, the mobile device may be configured to transmit a probe request to multiple Wi-Fi access points around the mobile device with the decreased signal transmission power. Further, the mobile device may be configured to receive probe responses from the Wi-Fi access points, which received the probe request from the mobile device, and to count a second number of the Wi-Fi access points. The second number may refer to a number of Wi-Fi access points that transmit probe responses when the Wi-Fi access points receive a probe request with the decreased signal transmission power. Since the signal transmission power of the probe request is decreased, the probe request reaches fewer Wi-Fi access points than a case that the probe request was transmitted with the maximized signal transmission power. So, the second number of the Wi-Fi access points is smaller than the first number of the Wi-Fi access points.

Further, the mobile device may be configured to determine whether the second number of the Wi-Fi access points is within the predetermined range. The mobile device may be configured to transmit, to a location estimating server, information regarding at least one of the decreased signal transmission power or Wi-Fi access point information included in the received probe responses, when the second number of the Wi-Fi access points is determined to be within the predetermined range. The location estimating server may be configured to calculate a location of the mobile device based at least in part on the information regarding the decreased signal transmission power or the Wi-Fi access point information, and to transmit location information regarding the calculated location of the mobile device to the mobile device.

Otherwise, the mobile device may be configured to adjust (i.e., decrease or increase) the signal transmission power of the probe request, when the second number of the Wi-Fi access points is determined to be out of the predetermined range. The mobile device may be configured to repeat the above described operations (e.g., transmitting of a probe request, counting of a number of Wi-Fi access points, determining whether the counted number is within the predetermined range) until a number of Wi-Fi access points that transmit a probe response to the mobile device is within the predetermined range. Further, the location of the mobile device may be determined based at least in part on the adjusted signal transmission power and Wi-Fi access point information, when the number of Wi-Fi access points that transmit the probe response to the mobile device is within the predetermined range.

FIG. 1 schematically shows an illustrative example of a mobile device location determination environment 10 including a mobile device 100, multiple Wi-Fi access points 105, 106, 107, 108, 109, 110, 111 and 112, and a location estimating server 115, arranged in accordance with at least some embodiments described herein. Although FIG. 1 illustrates that seven Wi-Fi access points are located around mobile device 100, one skilled in the art will appreciate that any number of Wi-Fi access points can be located around mobile device 100.

Mobile device 100 and location estimating server 115 may be communicatively connected to each other via a network. For example, but not as a limitation, the network may be implemented in accordance with any wireless network protocol, such as the Internet, a mobile radio communication network including at least one of a 3rd generation (3G) mobile telecommunications network, a 4th generation (4G) mobile telecommunications network, any other mobile telecommunications networks, a satellite network, Bluetooth, WiBro (Wireless Broadband Internet), Mobile WiMAX, HSDPA (High Speed Downlink Packet Access) or the like.

For example, but not as a limitation, mobile device 100 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), PDA (Personal Digital Assistant).

In some embodiments, mobile device 100 may be configured to set a signal transmission power of a probe request to a predetermined default signal transmission power. For example, mobile device 100 may be configured to set the signal transmission power to a maximized signal transmission power. Further, mobile device 100 may be configured to transmit the probe request with the default signal transmission power. For example, mobile device 100 may be configured to multicast the probe request around mobile device 100. By way of example, it is assumed that the probe request transmitted with the default signal transmission power reaches Wi-Fi access points 105, 106, 107, 108, 109, 110, 111 and 112 within a first range 120.

Each of multiple Wi-Fi access points 105, 106, 107, 108, 109, 110, 111 and 112, which received the probe request from the mobile device, may be configured to transmit a probe response to mobile device 100, in response to the probe request. For example, but not as a limitation, each probe response of Wi-Fi access points 105, 106, 107, 108, 109, 110, 111 and 112 may include at least one of an identifier, an internet protocol (IP) address, a media access control (MAC) address, a service set identifier (SSID), a port number, or location information of each of Wi-Fi access points 105, 106, 107, 108, 109, 110, 111 and 112. Further, the probe response may include a signal power or a bandwidth of a network which each of Wi-Fi access points 105, 106, 107, 108, 109, 110, 111 and 112 provides.

Further, mobile device 100 may be configured to receive the multiple probe responses from Wi-Fi access points 105, 106, 107, 108, 109, 110, 111 and 112. Mobile device 100 may be further configured to count a number of Wi-Fi access points 105, 106, 107, 108, 109, 110, 111 and 112 that transmit the probe responses. Further, mobile device 100 may be configured to determine whether the number of Wi-Fi access points 105, 106, 107, 108, 109, 110, 111 and 112 satisfies a predetermined condition. In some embodiments, mobile device 100 may be configured to determine whether the counted number of Wi-Fi access points 105, 106, 107, 108, 109, 110, 111 and 112 is within a predetermined range. For example, but not as a limitation, the predetermined range of a number of Wi-Fi access points is from two to three, since it is efficient to determine a location of mobile device 100 based on access point information regarding two or three Wi-Fi access points by using a triangulation method. Mobile device 100 may be configured to receive information regarding the predetermined range of a number of Wi-Fi access points from location estimating server 115. Alternatively, mobile device 100 may be configured to predefine and store the predetermined range of a number of Wi-Fi access points in a memory which is communicatively coupled to mobile device 100.

Further, mobile device 100 may be configured to adjust a signal transmission power of a probe request, when mobile device 100 determines that the counted number of Wi-Fi access points 105, 106, 107, 108, 109, 110, 111 and 112 does not satisfy the predetermined condition. In some embodiments, mobile device 100 may be configured to adjust the signal transmission power of the probe request, when mobile device 100 determines that the counted number of Wi-Fi access points 105, 106, 107, 108, 109, 110, 111 and 112 is out of the predetermined range. Mobile device 100 may be configured to increase the signal transmission power, so that the probe request to be transmitted with the increased signal transmission power reaches the predetermined range number of Wi-Fi access points, if the counted number of Wi-Fi access points 105, 106, 107, 108, 109, 110, 111 and 112 is determined to be smaller than the predetermined range. Alternatively, mobile device 100 may be configured to decrease the signal transmission power, so that the probe request to be transmitted with the decreased signal transmission power reaches the predetermined range number of Wi-Fi access points, if the counted number of Wi-Fi access points 105, 106, 107, 108, 109, 110, 111 and 112 is determined to be larger than the predetermined range.

Further, mobile device 100 may be configured to transmit a probe request with the adjusted signal transmission power. For example, mobile device 100 may be configured to multicast the probe request around mobile device 100. By way of example, if mobile device 100 decreased the signal transmission power, it is assumed that the probe request transmitted with the decreased signal transmission power reaches Wi-Fi access points 110, 111 and 112 within a second range 130. Since the signal transmission power of the probe request is decreased, the probe request reaches fewer Wi-Fi access points 110, 111 and 112 than a case that the probe request was transmitted with the default signal transmission power.

Further, mobile device 100 may be configured to receive multiple probe responses from Wi-Fi access points 110, 111 and 112. Mobile device 100 may be further configured to count a number of Wi-Fi access points 110, 111 and 112 that transmit the probe responses. Further, mobile device 100 may be configured to determine whether the number of Wi-Fi access points 110, 111 and 112 satisfies the predetermined condition. In some embodiments, mobile device 100 may be configured to determine whether the counted number of Wi-Fi access points 110, 111 and 112 is within the predetermined range.

Further, mobile device 100 may be configured to transmit, to location estimating server 115, at least one of signal information regarding the adjusted signal transmission power of the probe request or access point information regarding Wi-Fi access points 110, 111 and 112 that transmitted the probe responses, when mobile device 100 determines that the counted number of Wi-Fi access points 110, 111 and 112 satisfies the predetermined condition (e.g., when mobile device 100 determines that the counted number of Wi-Fi access points 110, 111 and 112 is within the predetermined range (e.g., from two to three)). By way of example, but not as a limitation, the access point information may include at least one of an identifier, an internet protocol (IP) address, a media access control (MAC) address, a service set identifier (SSID), a port number, location information of each of Wi-Fi access points 110, 111 and 112, or a signal power or a bandwidth of a network which Wi-Fi access points 110, 111 and 112 provide.

In some embodiments, location estimating server 115 may be configured to calculate a location of mobile device 100 based at least in part on at least one of the signal information regarding the adjusted signal transmission power of the probe request or the access point information regarding Wi-Fi access points 110, 111 and 112 that transmitted the probe responses. For example, but not as a limitation, location estimating server 115 may be configured to calculate the location of mobile device 100 by using any well-known locating method using a location of a Wi-Fi access point around a device, a distance between the Wi-Fi access point and the device or a signal strength between the Wi-Fi access point and the device. Location estimating server 115 may be configured to calculate the location of mobile device 100 based at least in part on at least one of the signal information regarding the adjusted signal transmission power of the probe request or the access point information regarding Wi-Fi access points 110, 111 and 112. Then, mobile device 100 may be configured to receive location information of mobile device 100 from location estimating server 115, and to determine the location of mobile device 100 finally.

In some other embodiments, location estimating server 115 may be configured to calculate locations of Wi-Fi access points 110, 111 and 112 by using any well-known locating method based at least in part on at least one of the signal information regarding the adjusted signal transmission power of the probe request or the access point information regarding Wi-Fi access points 110, 111 and 112. Alternatively, location estimating server 115 may be configured to detect location information of Wi-Fi access points 110, 111 and 112 from a database that stores access point information regarding multiple access points under control of location estimating server 115. Mobile device 100 may be configured to receive location information of Wi-Fi access points 110,

111 and 112 from location estimating server 115. Further, mobile device 100 may be configured to calculate a location of mobile device 100 based on the location information of Wi-Fi access points 110, 111 and 112 received from location estimating server 115. By way of example, mobile device 100 may be configured to calculate the location of mobile device 100 by using a triangulation method based on the location information of Wi-Fi access points 110, 111 and 112.

In some other embodiments, mobile device 100 may be configured to calculate the location of mobile device 100 based at least in part on the probe responses received from Wi-Fi access points 110, 111 and 112, when mobile device 100 determines that the counted number of Wi-Fi access points 110, 111 and 112 is within the predetermined range (e.g., from two to three). Mobile device 100 may be configured to calculate the location of mobile device 100 based at least in part on the probe responses, if the probe responses received from Wi-Fi access points 110, 111 and 112 includes location information of each of Wi-Fi access points 110, 111 and 112. By way of example, mobile device 100 may be configured to calculate the location of mobile device 100 by using a triangulation method based on the location information of Wi-Fi access points 110, 111 and 112.

Mobile device 100 may be configured to repeat the above described operations (e.g., transmitting of a probe request, counting of a number of Wi-Fi access points, determining whether the counted number satisfies a predetermined condition, adjusting a signal transmission power) until a number of Wi-Fi access points that transmit probe responses to mobile device 100 satisfies the predetermined condition. Further, a location of mobile device 100 may be determined based at least in part on at least one of the finally adjusted signal transmission power or access point information, when the number of Wi-Fi access points that transmit the probe responses to mobile device 100 satisfies the predetermined condition.

In some other embodiments, mobile device 100 may be configured to determine whether the counted number of Wi-Fi access points 105, 106, 107, 108, 109, 110, 111 and 112 is the same as a predetermined value.

For example, but not as a limitation, the predetermined value of a number of at least one Wi-Fi access point may be one. Mobile device 100 may be configured to adjust a signal transmission power of a probe request, when mobile device 100 determines that the counted number of Wi-Fi access points 105, 106, 107, 108, 109, 110, 111 and 112 is not one. Mobile device 100 may be configured to decrease the signal transmission power (e.g., set the signal transmission power to a minimized signal transmission power), so that the probe request to be transmitted with the decreased signal transmission power reaches only Wi-Fi access point 110 which exists the closest to mobile device 100. Further, mobile device 100 may be configured to receive a probe response from Wi-Fi access point 110. Mobile device 100 may be further configured to count a number of Wi-Fi access point 110 that transmits the probe response. Further, mobile device 100 may be configured to determine that the number of Wi-Fi access point 110 is the same as the predetermined value (e.g., one). Then, a location of mobile device 100 may be determined based at least in part on at least one of the finally adjusted signal transmission power (e.g., the minimized signal transmission power) or access point information regarding Wi-Fi access point 110 by location estimating server 115 or mobile device 100, as described above. By way of example, mobile device 100 may be configured to calculate the location of mobile device 100 based on the decreased signal transmission power and a location of Wi-Fi access point 110. By way of another example, mobile device 100 may be configured to regard the location of Wi-Fi access point 110 as the location of mobile device 100, since Wi-Fi access point 110 exists the closest to mobile device 100.

Figure 2:
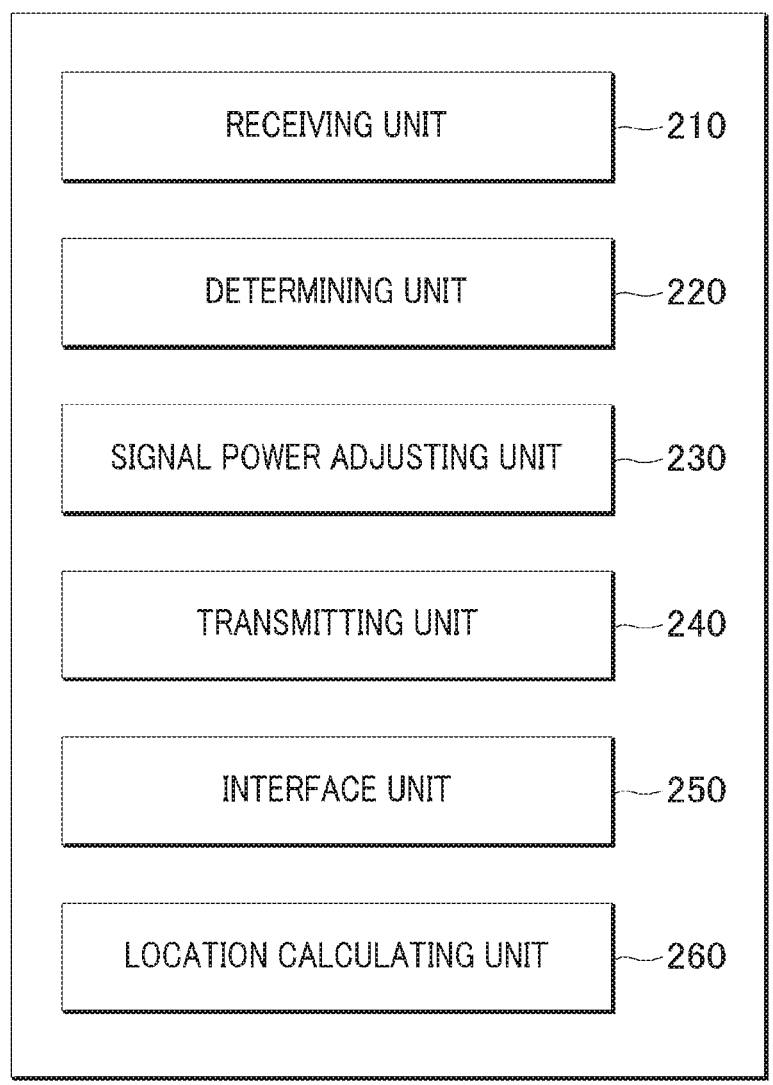
FIG. 2 shows schematic block diagram illustrating an example architecture for a mobile device, arranged in accordance with at least some embodiments described herein.

FIG. 2 shows schematic block diagram illustrating an example architecture for a mobile device 100, arranged in accordance with at least some embodiments described herein. As depicted in FIG. 2, mobile device 100 may include a receiving unit 210, a determining unit 220, a signal power adjusting unit 230, a transmitting unit 240, an interface unit 250 and a location calculating unit 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 210, determining unit 220, signal power adjusting unit 230, transmitting unit 240, interface unit 250 and location calculating unit 260 may be included in an instance of an application hosted by mobile device 100.

Receiving unit 210 may be configured to receive at least one probe response from at least one Wi-Fi access point. For example, but not as a limitation, the probe response may include at least one of an identifier, an internet protocol (IP) address, a media access control (MAC) address, a service set identifier (SSID), a port number, or location information of the at least one Wi-Fi access point. Further, the probe response may include a signal power or a bandwidth of a network which the at least one Wi-Fi access point provides.

Determining unit 220 may be configured to count a number of the at least one Wi-Fi access point that transmits the probe response. Further, determining unit 220 may be configured to determine whether the counted number of the at least one Wi-Fi access point satisfies a predetermined condition. In some embodiments, determining unit 220 may be configured to determine whether the counted number of the at least one Wi-Fi access point is within a predetermined range. In some other embodiments, determining unit 220 may be configured to determine whether the counted number of the at least one Wi-Fi access point is the same as a predetermined value.

Signal power adjusting unit 230 may be configured to adjust a signal transmission power of a probe request, when determining unit 220 determines that the counted number of the at least one Wi-Fi access point does not satisfy the predetermined condition. In some embodiments, signal power adjusting unit 230 may be configured to adjust the signal transmission power of the probe request, when determining unit 220 determines that the counted number of the at least one Wi-Fi access point is out of the predetermined range. By way of example, signal power adjusting unit 230 may be configured to increase the signal transmission power, so that the probe request to be transmitted with the increased signal transmission power reaches the predetermined range number of Wi-Fi access points, if the counted number of the at least one Wi-Fi access point is determined to be smaller than the predetermined range. Alternatively, signal power adjusting unit 230 may be configured to decrease the signal transmission power, so that the probe request to be transmitted with the decreased signal transmission power reaches the predetermined range number of Wi-Fi access points, if the counted number of the at least one Wi-Fi access point is determined to be larger than the predetermined range.

In some other embodiments, signal power adjusting unit 230 may be configured to adjust the signal transmission power of the probe request, when determining unit 220 determines that the counted number of the at least one Wi-Fi access point is different from the predetermined value. By way of example, signal power adjusting unit 230 may be configured to increase the signal transmission power, so that the probe request to be transmitted with the increased signal transmission power reaches the predetermined value of Wi-Fi access points, if the counted number of the at least one Wi-Fi access point is determined to be smaller than the predetermined value. Alternatively, signal power adjusting unit 230 may be configured to decrease the signal transmission power, so that the probe request to be transmitted with the decreased signal transmission power reaches the predetermined value of Wi-Fi access points, if the counted number of the at least one Wi-Fi access point is determined to be larger than the predetermined value.

Transmitting unit 240 may be configured to transmit a probe request with a default signal transmission power (e.g., a maximized signal transmission power). For example, transmitting unit 240 may be configured to multicast the probe request around mobile device 100. Further, transmitting unit 240 may be configured to transmit a probe request with the adjusted signal transmission power which is adjusted by signal power adjusting unit 230, when determining unit 220 determines that the counted number of the at least one Wi-Fi access point does not satisfy the predetermined condition.

Interface unit 250 may be configured to transmit, to location estimating server 115, at least one of signal information regarding the signal transmission power of the probe request or access point information regarding the at least one Wi-Fi access point that transmitted the probe response, when determining unit 220 determines that the counted number of the at least one Wi-Fi access point satisfies the predetermined condition (e.g., when determining unit 220 determines that the counted number of the at least one Wi-Fi access point is within the predetermined range). By way of example, but not as a limitation, the access point information may include at least one of an identifier, an internet protocol (IP) address, a media access control (MAC) address, a service set identifier (SSID), a port number, location information of the at least one Wi-Fi access point or a signal power or a bandwidth of a network which the at least one Wi-Fi access point provides.

In some embodiments, interface unit 250 may be configured to receive, from location estimating server 115, location information of mobile device 100 that is estimated based at least in part on at least one of the signal information or the access point information. In some other embodiments, interface unit 250 may be configured to receive, from location estimating server 115, location information of the at least one Wi-Fi access point that is estimated or detected based at least in part on at least one of the signal information or the access point information.

Further, interface unit 250 may be configured to receive information regarding the predetermined range of a number of Wi-Fi access points or the predetermined value from location estimating server 115.

In some embodiments, location calculating unit 260 may be configured to calculate a location of mobile device 100 based on the location information of the at least one Wi-Fi access point, which is received by interface unit 250. By way of example, location calculating unit 260 may be configured to calculate the location of mobile device 100 based on the signal transmission power and the location information of the at least one Wi-Fi access point by using any well-known locating method, such as a triangulation method.

In some other embodiments, location calculating unit 260 may be configured to calculate the location of mobile device 100 based at least in part on the probe response which is transmitted from the at least one Wi-Fi access point, when determining unit 220 determines that the counted number of the at least one Wi-Fi access point satisfies the predetermined condition (e.g., when determining unit 220 determines that the counted number of the at least one Wi-Fi access point is within the predetermined range). Location calculating unit 260 may be configured to calculate the location of mobile device 100 based at least in part on the probe response, if the probe response, which is transmitted from the at least one Wi-Fi access point, includes location information of the at least one Wi-Fi access point. By way of example, location calculating unit 260 may be configured to calculate the location of mobile device 100 based on at least one of the signal transmission power and the location information of the at least one Wi-Fi access point by using any well-known locating method, such as a triangulation method.

Figure 3:
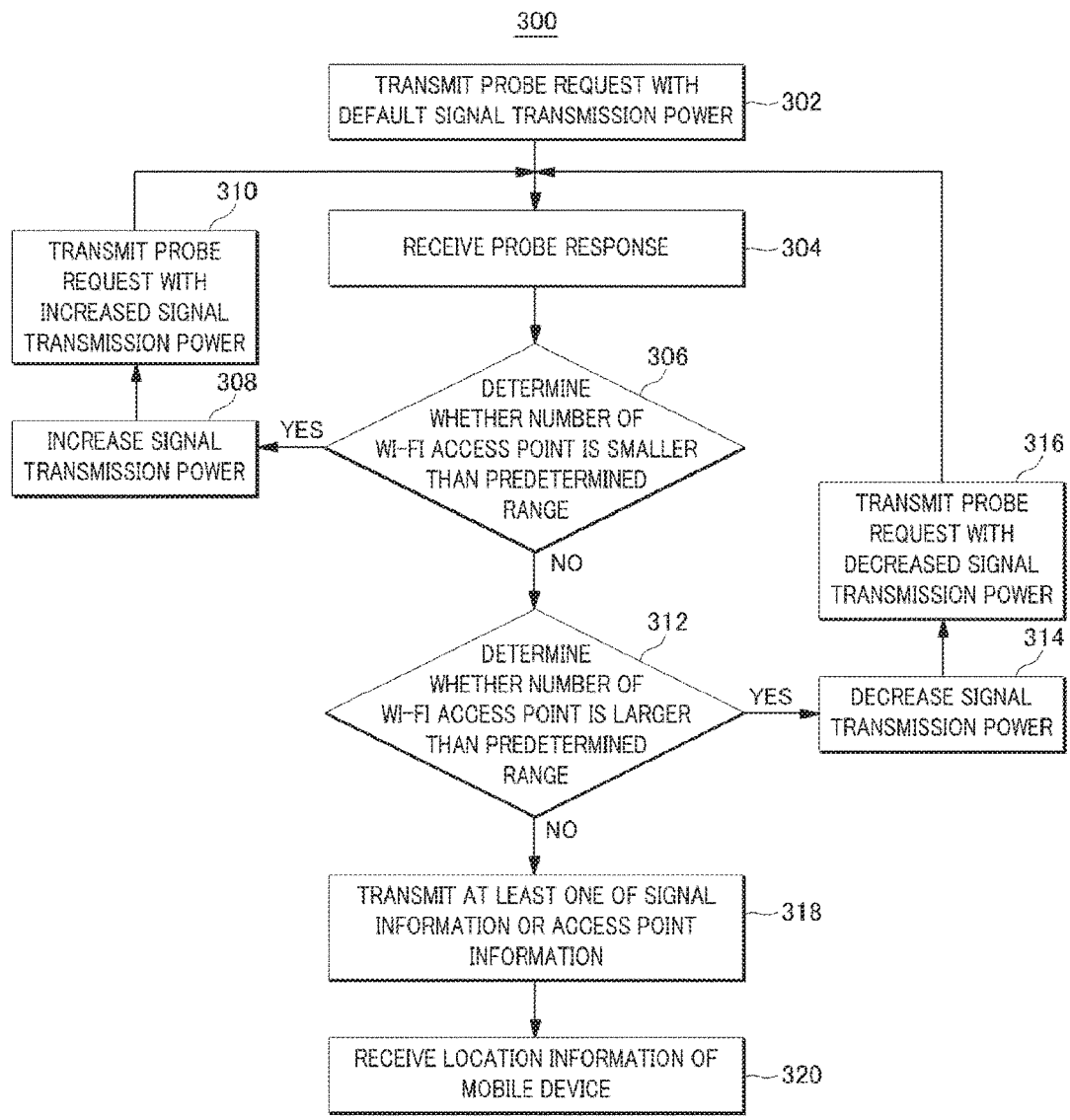
FIG. 3 shows an example flow diagram of a process for determining a location of a mobile device, arranged in accordance with at least some embodiments described herein.

FIG. 3 shows an example flow diagram of a process 300 for determining a location of a mobile device, arranged in accordance with at least some embodiments described herein. The operations of process 300 may be implemented in mobile device location determination environment 10 including mobile device 100, at least one Wi-Fi access point, and location estimating server 115, as illustrated in FIG. 1. Process 300 may include one or more operations, actions, or functions as illustrated by one or more blocks 302, 304, 306, 308, 310, 312, 314, 316, 318 and/or 320. Although illustrated as discrete blocks, various blocks may be divided into additional blocks, combined into fewer blocks, or eliminated, depending on the desired implementation. Processing may begin at block 302.

At block 302 (Transmit Probe Request with Default Signal Transmission Power), mobile device 100 may transmit a probe request with a default signal transmission power (e.g., a maximized signal transmission power). For example, mobile device 100 may multicast the probe request around mobile device 100. Processing may proceed from block 302 to block 304.

At block 304 (Receive Probe Response), mobile device 100 may receive at least one probe response from at least one Wi-Fi access point. The at least one Wi-Fi access point may transmit the at least one probe response to mobile device 100, when the at least one Wi-Fi access point receives the probe request. For example, but not as a limitation, the probe response may include at least one of an identifier, an internet protocol (IP) address, a media access control (MAC) address, a service set identifier (SSID), a port number, or location information of the at least one Wi-Fi access point. Further, the probe response may include a signal power or a bandwidth of a network which the at least one Wi-Fi access point provides. Processing may proceed from block 304 to block 306.

At block 306 (Determine Whether Number of Wi-Fi Access Point is Smaller than Predetermined Range), mobile device 100 may count a number of the at least one Wi-Fi access point that transmits the probe response. Further, mobile device 100 may determine whether the counted number of the at least one Wi-Fi access point is smaller than a predetermined range. By way of example, mobile device 100 may receive information regarding the predetermined range of a number of Wi-Fi access points from location estimating server 115. If mobile device 100 determines that the counted number of the at least one Wi-Fi access point is smaller than the predetermined range, processing may proceed to block 308, while otherwise, processing may proceed to block 312.

At block 308 (Increase Signal Transmission Power), mobile device 100 may increase a signal transmission power of a probe request, so that the probe request to be transmitted with the increased signal transmission power reaches the predetermined range number of Wi-Fi access points. Processing may proceed from block 308 to block 310.

At block 310 (Transmit Probe Request with Increased Signal Transmission Power), mobile device 100 may transmit a probe request with the signal transmission power, which is increased at block 308. For example, mobile device 100 may multicast the probe request around mobile device 100. Processing may proceed from block 310 to block 304.

Referring to block 312, at block 312 (Determine Whether Number of Wi-Fi Access Point is Larger than Predetermined Range), mobile device 100 may determine whether the number of the at least one Wi-Fi access point, which is counted at block 306, is larger than the predetermined range. If mobile device 100 determines that the counted number of the at least one Wi-Fi access point is larger than the predetermined range, processing may proceed to block 314, while otherwise, processing may proceed to block 318.

At block 314 (Decrease Signal Transmission Power), mobile device 100 may decrease a signal transmission power of a probe request, so that the probe request to be transmitted with the decreased signal transmission power reaches the predetermined range number of Wi-Fi access points. Processing may proceed from block 314 to block 316.

At block 316 (Transmit Probe Request with Decreased Signal Transmission Power), mobile device 100 may transmit a probe request with the signal transmission power, which is decreased at block 314. For example, mobile device 100 may multicast the probe request around mobile device 100. Processing may proceed from block 316 to block 304.

Referring to block 318, at block 318 (Transmit At Least One of Signal Information or Access Point Information), mobile device 100 may transmit, to location estimating server 115, at least one of signal information regarding the signal transmission power of the probe request or access point information regarding the at least one Wi-Fi access point, which is included in the predetermined range number. For example, but not as a limitation, the access point information may include at least one of an identifier, an internet protocol (IP) address, a media access control (MAC) address, a service set identifier (SSID), a port number, location information of the at least one Wi-Fi access point or a signal power or a bandwidth of a network which the at least one Wi-Fi access point provides. Processing may proceed from block 318 to block 320.

At block 320 (Receive Location Information of Mobile Device), mobile device 100 may receive, from location estimating server 115, location information of mobile device 100 that is estimated based at least in part on at least one of the signal information or the access point information, which is transmitted to location estimating server 115 at block 318.

Figure 4:
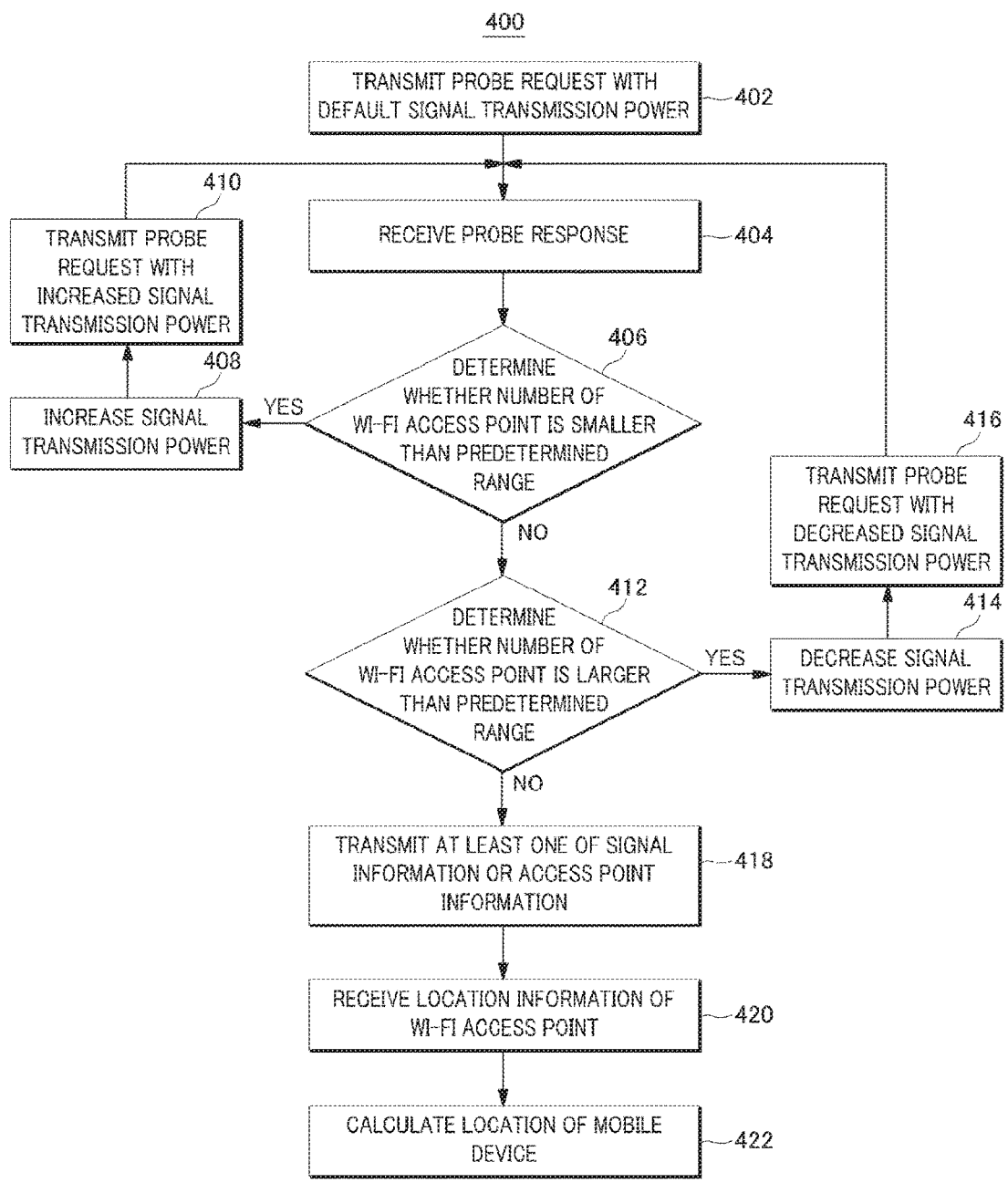
FIG. 4 shows another example flow diagram of a process for determining a location of a mobile device, arranged in accordance with at least some embodiments described herein.

FIG. 4 shows another example flow diagram of a process 400 for determining a location of a mobile device, arranged in accordance with at least some embodiments described herein. The operations of process 400 may be implemented in mobile device location determination environment 10 including mobile device 100, at least one Wi-Fi access point, and location estimating server 115, as illustrated in FIG. 1. Process 400 may include one or more operations, actions, or functions as illustrated by one or more blocks 402, 404, 406, 408, 410, 412, 414, 416, 418, 420 and/or 422. Although illustrated as discrete blocks, various blocks may be divided into additional blocks, combined into fewer blocks, or eliminated, depending on the desired implementation. Processing may begin at block 402.

At block 402 (Transmit Probe Request with Default Signal Transmission Power), mobile device 100 may transmit a probe request with a default signal transmission power (e.g., a maximized signal transmission power). For example, mobile device 100 may multicast the probe request around mobile device 100. Processing may proceed from block 402 to block 404.

At block 404 (Receive Probe Response), mobile device 100 may receive at least one probe response from at least one Wi-Fi access point. The at least one Wi-Fi access point may transmit the at least one probe response to mobile device 100, when the at least one Wi-Fi access point receives the probe request. For example, but not as a limitation, the probe response may include at least one of an identifier, an internet protocol (IP) address, a media access control (MAC) address, a service set identifier (SSID), a port number, or location information of the at least one Wi-Fi access point. Further, the probe response may include a signal power or a bandwidth of a network which the at least one Wi-Fi access point provides. Processing may proceed from block 404 to block 406.

At block 406 (Determine Whether Number of Wi-Fi Access Point is Smaller than Predetermined Range), mobile device 100 may count a number of the at least one Wi-Fi access point that transmits the probe response. Further, mobile device 100 may determine whether the counted number of the at least one Wi-Fi access point is smaller than a predetermined range. By way of example, mobile device 100 may receive information regarding the predetermined range of a number of Wi-Fi access points from location estimating server 115. If mobile device 100 determines that the counted number of the at least one Wi-Fi access point is smaller than the predetermined range, processing may proceed to block 408, while otherwise, processing may proceed to block 412.

At block 408 (Increase Signal Transmission Power), mobile device 100 may increase a signal transmission power of a probe request, so that the probe request to be transmitted with the increased signal transmission power reaches the predetermined range number of Wi-Fi access points. Processing may proceed from block 408 to block 410.

At block 410 (Transmit Probe Request with Increased Signal Transmission Power), mobile device 100 may transmit a probe request with the signal transmission power, which is increased at block 408. For example, mobile device 100 may multicast the probe request around mobile device 100. Processing may proceed from block 410 to block 404.

Referring to block 412, at block 412 (Determine Whether Number of Wi-Fi Access Point is Larger than Predetermined Range), mobile device 100 may determine whether the number of the at least one Wi-Fi access point, which is counted at block 406, is larger than the predetermined range. If mobile device 100 determines that the counted number of the at least one Wi-Fi access point is larger than the predetermined range, processing may proceed to block 414, while otherwise, processing may proceed to block 418.

At block 414 (Decrease Signal Transmission Power), mobile device 100 may decrease a signal transmission power of a probe request, so that the probe request to be transmitted with the decreased signal transmission power reaches the predetermined range number of Wi-Fi access points. Processing may proceed from block 414 to block 416.

At block 416 (Transmit Probe Request with Decreased Signal Transmission Power), mobile device 100 may transmit a probe request with the signal transmission power, which is decreased at block 414. For example, mobile device 100 may multicast the probe request around mobile device 100. Processing may proceed from block 416 to block 404.

Referring to block 418, at block 418 (Transmit At Least One of Signal Information or Access Point Information), mobile device 100 may transmit, to location estimating server 115, at least one of signal information regarding the signal transmission power of the probe request or access point information regarding the at least one Wi-Fi access point, which is included in the predetermined range number. For example, but not as a limitation, the access point information may include at least one of an identifier, an internet protocol (IP) address, a media access control (MAC) address, a service set identifier (SSID), a port number, location information of the at least one Wi-Fi access point or a signal power or a bandwidth of a network which the at least one Wi-Fi access point provides. Processing may proceed from block 418 to block 420.

At block 420 (Receive Location Information of Wi-Fi Access Point), mobile device 100 may receive, from location estimating server 115, location information of the at least one Wi-Fi access point that is estimated or detected based at least in part on at least one of the signal information or the access point information, which is transmitted to location estimating server 115 at block 418. Processing may proceed from block 420 to block 422.

At block 422 (Calculate Location of Mobile Device), mobile device 100 may calculate a location of mobile device 100 based on the location information of the at least one Wi-Fi access point, which is received at block 420. By way of example, mobile device 100 may calculate the location of mobile device 100 based on the signal transmission power and the location information of the at least one Wi-Fi access point by using any well-known locating method, such as a triangulation method.

Figure 5:
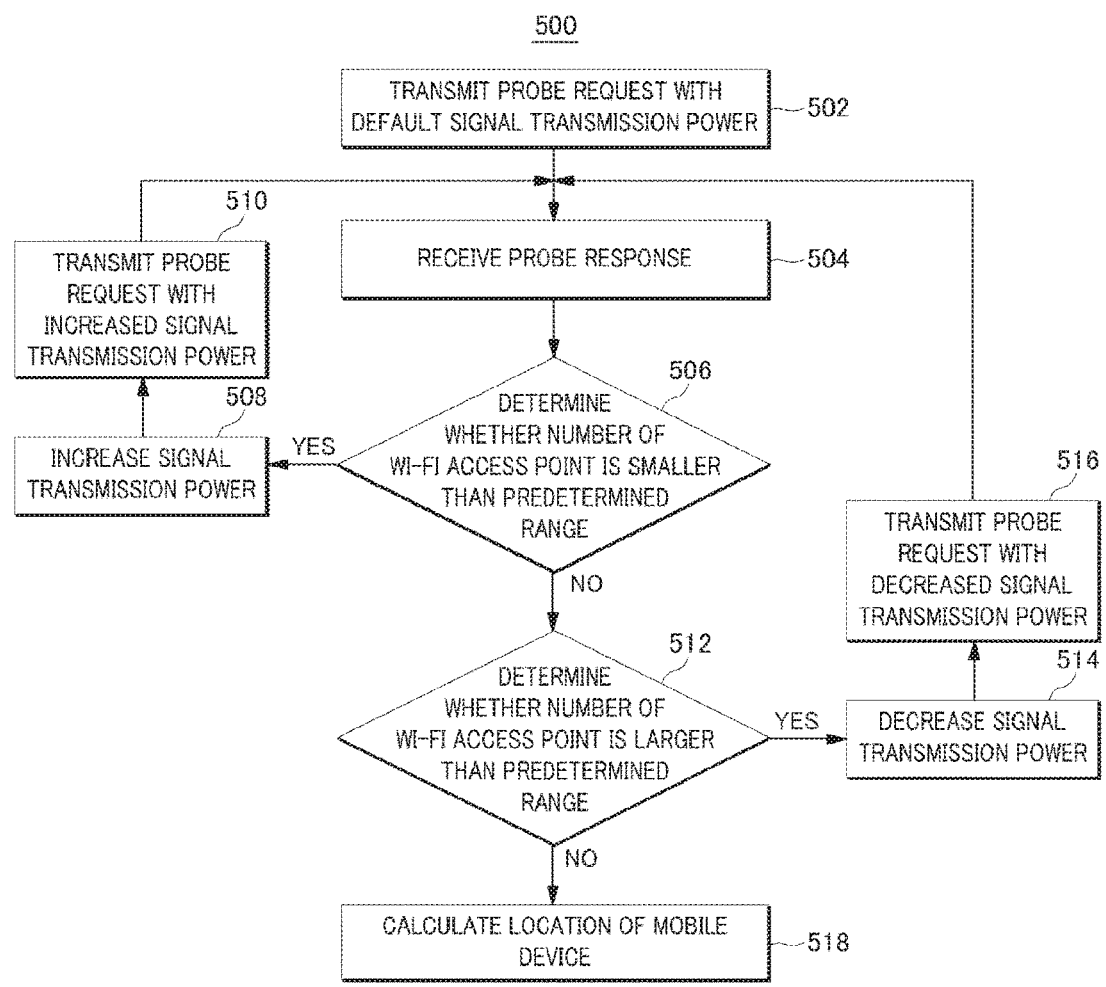
FIG. 5 shows still another example flow diagram of a process for determining a location of a mobile device, arranged in accordance with at least some embodiments described herein.

FIG. 5 shows still another example flow diagram of a process 500 for determining a location of a mobile device, arranged in accordance with at least some embodiments described herein. The operations of process 500 may be implemented in mobile device location determination environment 10 including mobile device 100, at least one Wi-Fi access point, and location estimating server 115, as illustrated in FIG. 1. Process 500 may include one or more operations, actions, or functions as illustrated by one or more blocks 502, 504, 506, 508, 510, 512, 514, 516 and/or 518. Although illustrated as discrete blocks, various blocks may be divided into additional blocks, combined into fewer blocks, or eliminated, depending on the desired implementation. Processing may begin at block 502.

At block 502 (Transmit Probe Request with Default Signal Transmission Power), mobile device 100 may transmit a probe request with a default signal transmission power (e.g., a maximized signal transmission power). For example, mobile device 100 may multicast the probe request around mobile device 100. Processing may proceed from block 502 to block 504.

At block 504 (Receive Probe Response), mobile device 100 may receive at least one probe response from at least one Wi-Fi access point. The at least one Wi-Fi access point may transmit the at least one probe response to mobile device 100, when the at least one Wi-Fi access point receives the probe request. For example, but not as a limitation, the probe response may include at least one of an identifier, an internet protocol (IP) address, a media access control (MAC) address, a service set identifier (SSID), a port number, or location information of the at least one Wi-Fi access point. Further, the probe response may include a signal power or a bandwidth of a network which the at least one Wi-Fi access point provides. Processing may proceed from block 504 to block 506.

At block 506 (Determine Whether Number of Wi-Fi Access Point is Smaller than Predetermined Range), mobile device 100 may count a number of the at least one Wi-Fi access point that transmits the probe response. Further, mobile device 100 may determine whether the counted number of the at least one Wi-Fi access point is smaller than a predetermined range. By way of example, mobile device 100 may receive information regarding the predetermined range of a number of Wi-Fi access points from location estimating server 115. If mobile device 100 determines that the counted number of the at least one Wi-Fi access point is smaller than the predetermined range, processing may proceed to block 508, while otherwise, processing may proceed to block 512.

At block 508 (Increase Signal Transmission Power), mobile device 100 may increase a signal transmission power of a probe request, so that the probe request to be transmitted with the increased signal transmission power reaches the predetermined range number of Wi-Fi access points. Processing may proceed from block 508 to block 510.

At block 510 (Transmit Probe Request with Increased Signal Transmission Power), mobile device 100 may transmit a probe request with the signal transmission power, which is increased at block 508. For example, mobile device 100 may multicast the probe request around mobile device 100. Processing may proceed from block 510 to block 504.

Referring to block 512, at block 512 (Determine Whether Number of Wi-Fi Access Point is Larger than Predetermined Range), mobile device 100 may determine whether the number of the at least one Wi-Fi access point, which is counted at block 506, is larger than the predetermined range. If mobile device 100 determines that the counted number of the at least one Wi-Fi access point is larger than the predetermined range, processing may proceed to block 514, while otherwise, processing may proceed to block 518.

At block 514 (Decrease Signal Transmission Power), mobile device 100 may decrease a signal transmission power of a probe request, so that the probe request to be transmitted with the decreased signal transmission power reaches the predetermined range number of Wi-Fi access points. Processing may proceed from block 514 to block 516.

At block 516 (Transmit Probe Request with Decreased Signal Transmission Power), mobile device 100 may transmit a probe request with the signal transmission power, which is decreased at block 514. For example, mobile device 100 may multicast the probe request around mobile device 100. Processing may proceed from block 516 to block 504.

Referring to block 518, at block 518 (Calculate Location of Mobile Device), mobile device 100 may calculate a location of mobile device 100 based at least in part on the probe response which is transmitted from the at least one Wi-Fi access point, if the probe response includes location information of the at least one Wi-Fi access point. By way of example, mobile device 100 may calculate the location of mobile device 100 based on the signal transmission power and the location information of the at least one Wi-Fi access point by using any well-known locating method, such as a triangulation method.

Figure 6:
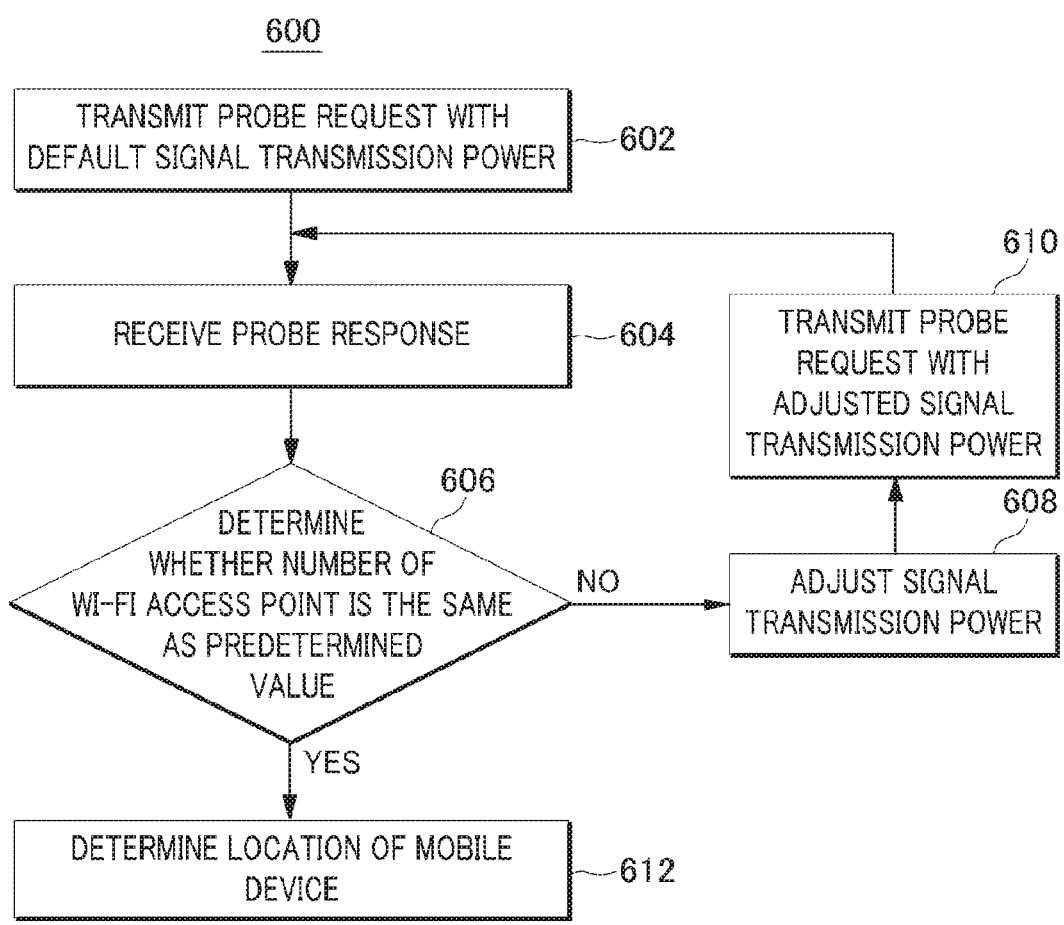
FIG. 6 shows still another example flow diagram of a process for determining a location of a mobile device, arranged in accordance with at least some embodiments described herein.

FIG. 6 shows still another example flow diagram of a process 600 for determining a location of a mobile device, arranged in accordance with at least some embodiments described herein. The operations of process 600 may be implemented in mobile device location determination environment 10 including mobile device 100, at least one Wi-Fi access point, and location estimating server 115, as illustrated in FIG. 1. Process 600 may include one or more operations, actions, or functions as illustrated by one or more blocks 602, 604, 606, 608, 610 and/or 612. Although illustrated as discrete blocks, various blocks may be divided into additional blocks, combined into fewer blocks, or eliminated, depending on the desired implementation. Processing may begin at block 602.

At block 602 (Transmit Probe Request with Default Signal Transmission Power), mobile device 100 may transmit a probe request with a default signal transmission power (e.g., a maximized signal transmission power). For example, mobile device 100 may multicast the probe request around mobile device 100. Processing may proceed from block 602 to block 604.

At block 604 (Receive Probe Response), mobile device 100 may receive at least one probe response from at least one Wi-Fi access point. The at least one Wi-Fi access point may transmit the at least one probe response to mobile device 100, when the at least one Wi-Fi access point receives the probe request. For example, but not as a limitation, the probe response may include at least one of an identifier, an internet protocol (IP) address, a media access control (MAC) address, a service set identifier (SSID), a port number, or location information of the at least one Wi-Fi access point. Further, the probe response may include a signal power or a bandwidth of a network which the at least one Wi-Fi access point provides. Processing may proceed from block 604 to block 606.

At block 606 (Determine Whether Number of Wi-Fi Access Point is the Same as Predetermined Value), mobile device 100 may count a number of the at least one Wi-Fi access point that transmits the probe response. Further, mobile device 100 may determine whether the counted number of the at least one Wi-Fi access point is the same as a predetermined value. By way of example, mobile device 100 may receive information regarding the predetermined value from location estimating server 115. If mobile device 100 determines that the counted number of the at least one Wi-Fi access point is different from the predetermined value, processing may proceed to block 608, while otherwise, processing may proceed to block 612.

At block 608 (Adjust Signal Transmission Power), mobile device 100 may adjust a signal transmission power of a probe request, so that the probe request to be transmitted with the adjusted signal transmission power reaches the predetermined value number of Wi-Fi access points. By way of example, mobile device 100 may increase the signal transmission power of the probe request, if mobile device 100 determines that the counted number of the at least one Wi-Fi access point is smaller than the predetermined value, at block 606. Further, mobile device 100 may decrease the signal transmission power of the probe request, if mobile device 100 determines that the counted number of the at least one Wi-Fi access point is larger than the predetermined value, at block 606. Processing may proceed from block 608 to block 610.

At block 610 (Transmit Probe Request with Adjusted Signal Transmission Power), mobile device 100 may transmit a probe request with the signal transmission power, which is adjusted at block 608. For example, mobile device 100 may multicast the probe request around mobile device 100. Processing may proceed from block 610 to block 604.

Referring to block 612, at block 612 (Determine Location of Mobile Device), mobile device 100 may determine a location of mobile device 100 based at least in part on the signal transmission power and location information of the at least one Wi-Fi access point. In some embodiments, the location of mobile device 100 may be calculated by location estimating server 115, and mobile device 100 may receive the calculated location of mobile device 100 from location estimating server 115. In some other embodiments, mobile device 100 may calculate the location of mobile device 100. In some other embodiments, if the predetermined value is one, mobile device 100 regard the location of the Wi-Fi access point which transmitted the probe response as the location of mobile device 100, since the Wi-Fi access point which transmitted the probe response to mobile device 100 is the closest Wi-Fi access point to mobile device 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
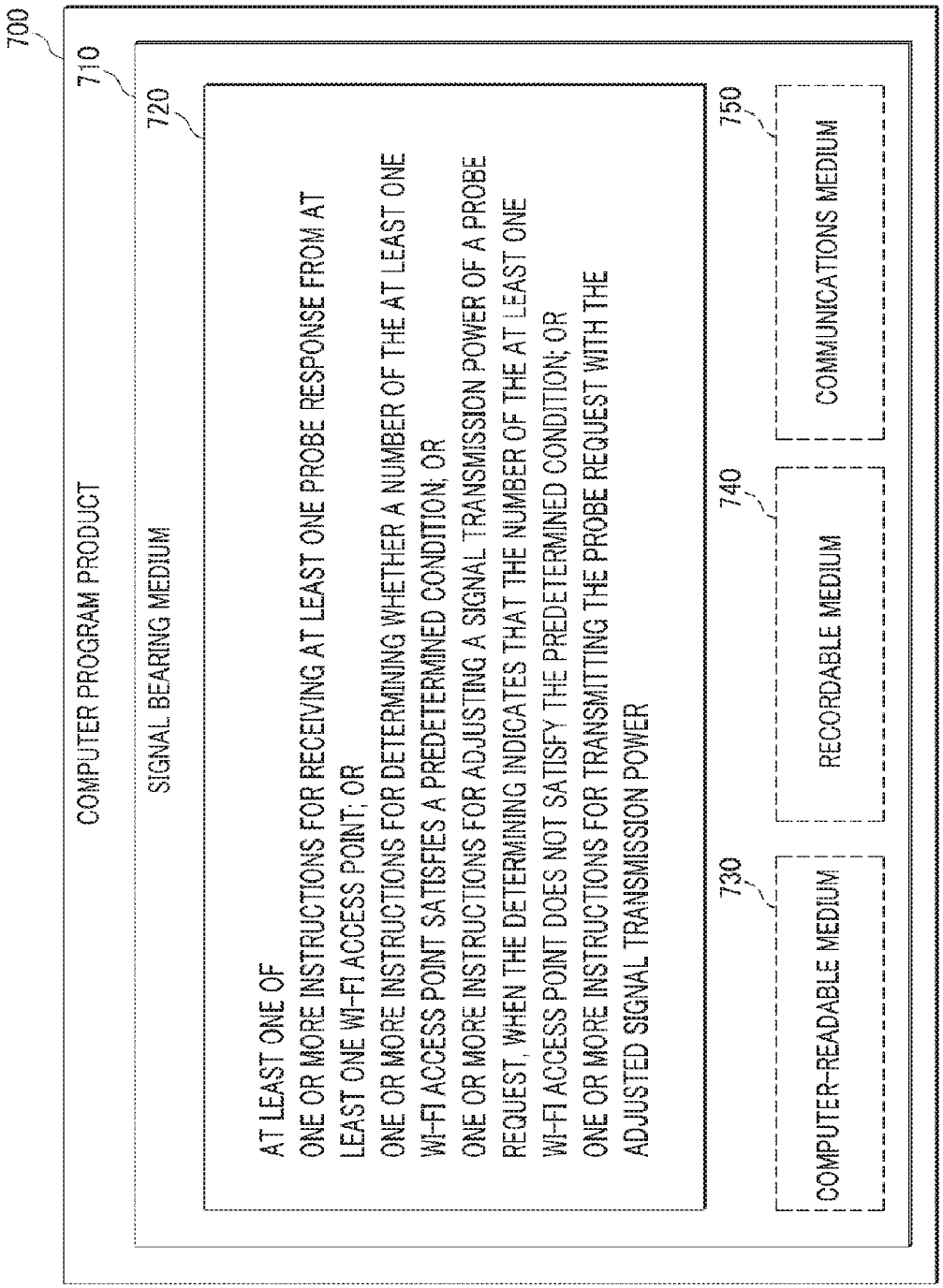
FIG. 7 illustrates computer program products that may be utilized to provide a scheme for determining a location of a mobile device, arranged in accordance with at least some embodiments described herein.

FIG. 7 illustrates computer program products that may be utilized to provide a scheme for determining a location of a mobile device, arranged in accordance with at least some embodiments described herein. Program product 700 may include a signal bearing medium 710. Signal bearing medium 710 may include one or more instructions 720 that, when executed by, for example, a mobile device, may provide the functionality described above with respect to FIGS. 1-6. By way of example, but not limitation, instructions 720 may include: one or more instructions for receiving at least one probe response from at least one Wi-Fi access point; one or more instructions for determining whether a number of the at least one Wi-Fi access point satisfies a predetermined condition; one or more instructions for adjusting a signal transmission power of a probe request, when the determining indicates that the number of the at least one Wi-Fi access point does not satisfy the predetermined condition; one or more instructions for transmitting the probe request with the adjusted signal transmission power. Thus, for example, referring to FIG. 3, mobile device 100 may undertake one or more of the blocks shown in FIG. 3 in response to instructions 720.

In some implementations, signal bearing medium 710 may encompass a computer-readable medium 730, such as, but not limited to, a hard disk drive, a CD, a DVD, a digital tape, memory, etc. In some implementations, signal bearing medium 710 may encompass a recordable medium 740, such as, but not limited to, memory, read/write (R/W) CDs, R/W DVDs, etc. In some implementations, signal bearing medium 710 may encompass a communications medium 750, such as, but not limited to, a digital and/or an analog communication medium (e.g., a fiber optic cable, a waveguide, a wired communications link, a wireless communication link, etc). Thus, for example, program product 700 may be conveyed to one or more modules of mobile device 100 by an RF signal bearing medium 720, where the signal bearing medium 720 is conveyed by a wireless communications medium 750 (e.g., a wireless communications medium conforming with the IEEE 802.11 standard).

FIG. 8 is a block diagram illustrating an example computing device that may be utilized to provide a scheme for determining a location of a mobile device, arranged in accordance with at least some embodiments described herein. In these examples, elements of computing device 800 may be arranged or configured for a device. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (uP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc) or any combination thereof. System memory 806 may include an operating system 820, an application 822, and program data 824. Application 822 may include instructions 826 that may be arranged to perform the functions as described herein including the actions described with respect to a mobile device architecture as shown in FIG. 2 or including the actions described with respect to the flow charts shown in FIGS. 3-6. In some examples, application 822 may be arranged to operate with program data 824 on an operating system 820 such that the schemes for determining a location of a mobile device as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc) or other peripheral devices (e.g., printer, scanner, etc) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc). In those instances where a convention analogous to "at least one of A, B, or C, etc" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc As a non-limiting example, each range discussed herein can be readily broken down into a lower third, middle third and upper third, etc As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of a mobile device, the method comprising:
 receiving at least one probe response from one or more Wi-Fi access points;
 counting a number of the one or more Wi-Fi access points that transmit the at least one probe response;
 comparing the counted number of the one or more Wi-Fi access points to a selected value; and
 responsive to the comparison of the counted number of the one or more Wi-Fi access points to the selected value:
  increasing a transmission signal power level, associated with a probe request, in response to the counted number of the one or more Wi-Fi access points being less than the selected value;
  decreasing the transmission signal power level, associated with the probe request, in response to the counted number of the one or more Wi-Fi access points being greater than the selected value; and
  transmitting information to a location estimation server, in response to the counted number of the one or more Wi-Fi access points being equal to the selected value, wherein the information corresponds to the transmission signal power level associated with the probe request.

2. The method of claim 1, wherein the transmitting the information to the location estimation server comprises transmitting information that corresponds to access point information associated with the one or more Wi-Fi access points.

3. The method of claim 2, further comprising receiving, from the location estimation server, location information of the mobile device, wherein the received location information of the mobile device is estimated based on one or more of the information that corresponds to the transmission signal power level and the information that corresponds to the access point information.

4. The method of claim 1, further comprising:
 receiving, from the location estimation server, location information of the one or more Wi-Fi access points; and
 determining a location of the mobile device based at least, in part, on the received location information of the one or more Wi-Fi access points.

5. The method of claim 1, further comprising:
prior to the receiving the at least one probe response, transmitting the probe request to the one or more Wi-Fi access points, wherein the transmission of the probe request is performed at the transmission signal power level.

6. The method of claim 1, further comprising receiving, from the location estimation server, another information that corresponds to the selected value.

7. The method of claim 1, wherein the comparing the counted number of the one or more Wi-Fi access points to the selected value comprises comparing the counted number of the one or more Wi-Fi access points to a value which is included within a particular range.

8. The method of claim 1, wherein the comparing the counted number of the one or more Wi-Fi access points to the selected value comprises comparing the counted number of the one or more Wi-Fi access points to a value received from the location estimation server.

9. A mobile device, comprising:
a receiver configured to receive at least one probe response from one or more Wi-Fi access points;
a processor coupled to the receiver, wherein the processor is configured to:
count a number of the one or more Wi-Fi access points that transmit the at least one probe response;
compare the counted number of the one or more Wi-Fi access points to a selected value;
increase a transmission signal power level, associated with a probe request, in response to the counted number of the one or more Wi-Fi access points being less than the selected value; and
decrease the transmission signal power level, associated with the probe request, in response to the counted number of the one or more Wi-Fi access points being greater than the selected value; and
a transmitter coupled to the processor and configured to:
transmit information to a location estimation server, in response to the counted number of the one or more Wi-Fi access points being equal to the selected value, wherein the information corresponds to the transmission signal power level associated with the probe request.

10. The mobile device of claim 9, wherein the receiver is further configured to receive, from the location estimation server, location information of the mobile device, wherein the received location information is estimated based on the information.

11. The mobile device of claim 9, wherein to transmit the information to the location estimation server, the transmitter is configured to transmit information that corresponds to access point information associated with the one or more Wi-Fi access points.

12. The mobile device of claim 11, wherein the receiver is further configured to receive, from the location estimation server, location information of the mobile device, wherein the received location information is estimated based at least, in part, on the access point information.

13. The mobile device of claim 9, wherein:
the receiver is further configured to receive, from the location estimation server, location information of the one or more Wi-Fi access points; and
the processor is further configured to determine the location of the mobile device based at least, in part, on the received location information of the one or more Wi-Fi access points.

14. The mobile device of claim 9, wherein the receiver is further configured to receive, from the location estimation server, another information that corresponds to the selected value.

* * * * *